United States Patent Office 2,864,873
Patented Dec. 16, 1958

2,864,873

PRODUCTION OF 1,1,2-TRIFLUORO-2-CHLOROETHYLENE

Charles B. Miller, Lynbrook, N. Y., and Lee B. Smith, Woodbridge, N. J., assignors to Allied Chemical Corporation, a corporation of New York No Drawing. Application March 16, 1954
Serial No. 416,697

4 Claims.  (Cl. 260—653.5)

This invention relates to a process for preparing 1,1,2-trifluoro-2-chloroethylene by dechlorination with hydrogen in the vapor phase of 1,1,2-trifluoro-1,2,2-trichloroethane.

1,1,2-trifluoro-2-chloroethylene has been prepared in the past by dechlorination in the liquid phase of 1,1,2-trifluoro-1,2,2-trichloroethane by reaction with zinc in the presence of anhydrous solvents such as acetamide, 2-ethylhexanol, ethanol, etc. This process, however, has the disadvantage of necessitating the use of expensive zinc and anhydrous organic solvents and in requiring removal of by-product zinc chloride.

The principal object of the present invention lies in the provision of a process for making 1,1,2-trifluoro-2-chloroethylene from 1,1,2-trifluoro-1,2,2-trichloroethane by a thermocatalytic procedure which may be carried out at reduced temperatures.

We have found that 1,1,2-trifluoro-2-chloroethylene may advantageously be prepared according to our process which is adapted for continuous, as well as batch, operation by reacting hydrogen with 1,1,2-trifluoro-1,2,2-trichloroethane in the vapor phase at temperatures between about 325° and about 425° C. in the presence of a catalyst comprising a metal of the group consisting of copper and nickel together with an oxide of chromium.

The reaction may be illustrated by the equation below:

$$CCl_2FCClF_2 + H_2 \longrightarrow CClF=CF_2 + 2HCl$$

1,1,2-trifluoro-                1,1,2-trifluoro-
1,2,2-trichloroethane          2-chloroethylene In general, procedural steps of the invention comprise passing hydrogen and vapors of 1,1,2-trifluoro-1,2,2-trichloroethane through a suitable reactor while maintaining therein certain catalysis conditions, discharging the reaction products from the reactor, scrubbing the product gases, e. g. with water, to remove hydrogen chloride, drying and condensing the gases, and then distilling the condensate to obtain the desired 1,1,2-trifluoro-2-chloroethylene product.

In carrying out the process of our invention, a vaporous mixture of hydrogen and 1,1,2-trifluoro-1,2,2-trichloroethane is passed at a temperature of about 325° C. to about 425° C., preferably at a temperature of about 350° C. to about 400° C., through a reactor charged with a catalyst comprising a metal of the group consisting of copper and nickel together with an oxide of chromium for a period sufficient to bring about the dechlorination reaction, i. e. removal of two chlorine atoms of the 1,1,2-trifluoro-1,2,2-trichloroethane. By preference the time of residence of the reactants in contact with the catalyst is sufficient to insure complete reaction of all the hydrogen in the mixture. The HCl formed in the reaction is then removed, e. g. by scrubbing the vapors with water or aqueous alkali. The reaction vapors are then treated to remove the major portion of unreacted 1,1,2-trifluoro-1,2,2-trichloroethane, e. g. by refrigeration to a suitably low temperature. The remaining gas is then treated, as by further refrigeration, to a temperature low enough to condense the lower boiling 1,1,2-trifluoro-2-chloroethylene product and any small remaining portion of unreacted 1,1,2-trifluoro-1,2,2-trichloroethane, the latter being readily removed by distillation. The resulting product is then condensed under suitable pressures and temperatures.

The catalyst employed in our process may be prepared by coprecipitating the hydroxides of the active metal and chromium by the addition of a solution of potassium hydroxide to a solution of their nitrates, filtering, washing and drying the filter cake. The dried cake may be granulated, pressed into pellets or used in other desirable physical form. Prior to use in the reaction system of this invention, the catalyst is placed in the reactor and reduced in a stream of hydrogen while slowly raising the temperature. To prevent excessive temperature rise due to heat of reduction, the hydrogen may be diluted with nitrogen. If desired, the catalyst may be used on a suitable support or a support may be coprecipitated with it. Although calcium fluoride is preferred as the support, other supports such as other alkaline earth fluorides may be used.

Spent catalyst can be reconverted to the starting materials required for catalyst preparation by digestion of the spent catalyst with nitric acid.

The preferred catalyst of our invention comprises copper metal and an oxide of chromium which may or may not be supported on calcium fluoride. Particularly outstanding results have been obtained using a catalyst comprising copper metal and an oxide of chromium supported on calcium fluoride in which the weight ratio of copper to oxide of chromium is about 2 to 1.

However, economically high conversions of desired 1,1,2-trifluoro-2-chloroethylene are obtainable with catalysts of wide range of composition containing, for example, one part or more by weight of copper or nickel to every ten parts of chromium oxide. It is preferred that the weight ratio of these catalyst components, in the order named, be at least 1:1.

The hydrogen and 1,1,2-trifluoro-1,2,2-trichloroethane reactant may be mixed in any desired proportions, conveniently in the equimolecular proportions in which they combine. Unreacted hydrogen, if present, is difficult to remove, involving a complicated distillation or other difficult or expensive separation process. It is, therefore, advantageous and preferable to adjust the ratios and reaction temperature and time so that hydrogen is completely reacted in order to avoid the above difficulty.

The temperatures at which the reaction may be carried out at normal atmospheric pressures or superatmospheric pressures, as indicated above, lie in the range of about 325° C. to about 425° C. and preferably are about 350° C. to about 400° C. At temperatures lower than about 325° C. little or no reaction is obtained, whereas at temperatures above about 425° C. there is markedly increased tendency for the thermocracking of 1,1,2-trifluoro-1,2,2-trichloroethane with the formation of undesired by-products.

Heretofore, in order to obtain high conversion of 1,1,2-trifluoro-1,2,2-trichloroethane to 1,1,2-trifluoro-2-chloroethylene, it has been found necessary to employ temperatures in excess of about 450° C. The process of the present invention, therefore, possesses the distinct advantage of allowing the use of appreciably lower reaction temperatures while at the same time giving high conversions.

Space velocity of the gaseous reactants (volumes of reactant gas at room temperature per volume of catalyst per hour) may lie in the range of 100 to 700, and space velocities of about 200 to 300 have been found to be particularly desirable.

The reaction rate at the temperature specified is usually quite rapid, so that the contact time is not particularly critical, depending, however, somewhat on the intimacy of mixing of the reactants, the ratio of hydrogen to 1,1,2-trifluoro-1,2,2-trichloroethane reactant, etc. Under conditions of passage of the mixed vapors through a conventional packed reactor, the contact time of the vapor mixture with the heated packing material is usually at least about 10 seconds when approximately stoichiometric proportions of the reactants are employed.

The hydrogen chloride formed in the reaction may be removed in any suitable manner, for example, by contacting the mixed gases with water or aqueous alkaline material in a conventional manner.

Since unreacted 1,1,2-trifluoro-1,2,2-trichloroethane has a boiling point higher than the 1,1,2-trifluoro-2-chloroethylene product, i. e. 47.6° C. as against —28° C., it is convenient to first separate the unreacted material from the HCl-free mixed reaction gases, as by condensations, and then recover the product by further condensation, for example at lower temperatures and/or higher pressures.

The 1,1,2-trifluoro-2-chloroethylene product of the present invention is useful in carrying out polymerization reactions to produce polymers or copolymers useful as films, plastics and the like.

The following specific examples in which parts are by weight further illustrate our invention.

Example 1.—A catalyst comprising copper metal and an oxide of chromium supported on calcium fluoride was prepared as follows: 167 parts of $Ca(NO_3)_2.4H_2O$, 114 parts of $Cu(NO_3)_2.3H_2O$ and 115 parts of $$Cr(NO_3)_3.9H_2O$$

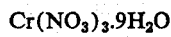

were dissolved in about 1400 parts of water. To this solution was added a solution of 165 parts of KF and 128 parts of KOH in about 1000 parts of water. The resultant mixture was boiled, filtered, washed and dried. Prior to use the catalyst was dried up to 350° C. in a current of nitrogen, reduced up to 350° C. with a stream of hydrogen diluted with nitrogen and then up to 350° C. with a stream of hydrogen. The catalyst contained about 55% calcium fluoride, about 30% copper metal and about 15% chromium oxide. A vaporous mixture of 214 parts of $CCl_2FCClF_2$ (1.14 mols) and 2 parts of hydrogen (1 mol) were passed at a space velocity of 240 and over a period of about two hours through a nickel reactor containing about 100 cc. of the above catalyst maintained at a temperature of about 400° C. The vaporous mixture after passing through the reactor was scrubbed with water to remove HCl and dried over $CaCl_2$. The dried gases were then led through a water-ice trap at 0° C. to condense unreacted $CCl_2FCClF_2$ and finally through a —78° C. trap to condense $CClF=CF_2$ product. The combined condensates were distilled and yielded 57 parts of $CClF=CF_2$ which represented a conversion of 43%. Conversion was computed by dividing the number of mols of the product by the number of mols of the reactant fed.

Example 2.—A catalyst comprising copper metal supported on calcium fluoride was prepared as follows: 150 parts of $Ca(NO_3)_2.4H_2O$ and 150 parts of $$Cu(NO_3)_2.3H_2O$$

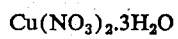

were dissolved in about 1250 parts of water. A solution of 150 parts KF and 75 parts of KOH in about 1250 parts of water was added to the first solution while stirring. The mixture was then boiled, filtered, washed, dried and crushed to about 8–14 mesh. Prior to use the catalyst was reduced up to 350° C. in a stream of hydrogen diluted with nitrogen and then up to 350° C. in a stream of hydrogen. The catalyst contained about 60% calcium fluoride and about 40% copper metal.

A vaporous mixture of 193 parts of $CCl_2FCClF_2$ (1.03 mols) and 2 parts of hydrogen (1 mol) were reacted in accordance with the procedure outlined in Example 1. Only 15 parts of $CClF=CF_2$, representing a conversion of 12.5%, were obtained. This run shows that exceedingly low conversions are obtained at the low temperature conditions of the present invention using a copper metal catalyst which has not been combined with an oxide of chromium.

Example 3.—A chromium oxide catalyst was prepared as follows: 167 parts of $Ca(NO_3)_2.4H_2O$ and 346 parts of $Cr(NO_3)_3.9H_2O$ were dissolved in about 1500 parts of water. To this solution was added a solution of 167 parts of KF and 280 parts of KOH in about 800 parts of water. The mixture was boiled, filtered, washed, dried and granulated to 6–14 mesh. Prior to use the catalyst was reduced up to 350° C. in a stream of hydrogen.

A vaporous mixture of 224 parts of $CCl_2FCClF_2$ (1.2 mols) and 2 parts of hydrogen (1 mol) were reacted in accordance with the procedure of Example 1. The catalyst, however, was maintained at 350° C. No yield of $CClF=CF_2$ was obtained. This run shows that a chromium oxide catalyst is inactive as a catalyst in the present invention.

Example 4.—A catalyst comprising copper metal and an oxide of chromium supported on calcium fluoride was prepared in the same manner as the catalyst of Example 1 but with a copper to chromium oxide ratio of about 1 to 1 instead of about 2 to 1.

A vaporous mixture of 187 parts of $CCl_2FCClF_2$ (1 mol) and 2 parts of hydrogen (1 mol) were reacted in accordance with the procedure of Example 1 except that the catalyst was maintained at 350° C. 28 parts of $CClF=CF_2$, representing a 24.1% conversion, were obtained.

Example 5.—A catalyst comprising copper metal and an oxide of chromium was prepared as follows: 230 parts of $Cr(NO_3)_3.9H_2O$ and 228 parts of $$Cu(NO_3)_2.3H_2O$$

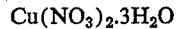

were dissolved in about 2000 parts of water. To this solution was added a solution of 250 parts of KOH in about 800 parts of water. The catalyst was then boiled, filtered, washed, dried, and screened through a 6–14 mesh. The catalyst was pelleted and reduced in a stream of hydrogen up to 350° C. The catalyst contained a copper metal to chromium oxide ratio of about 2 to 1.

A vaporous mixture of 207 parts of $CCl_2FCClF_2$ (1.1 mols) and 2 parts of hydrogen (1 mol) was reacted in accordance with the procedure of Example 1 except that the catalyst was maintained at 350° C. 46 parts of $CClF=CF_2$, representing a conversion of 37.8%, were obtained.

Example 6.—A catalyst comprising copper metal and an oxide of chromium supported on calcium fluoride was prepared as follows: 167 parts of $Ca(NO_3)_2.4H_2O$, 232 parts of $Cr(NO_3)_3 9H_2O$ and 57 parts of $Cu(NO_3)_2.3H_2O$ were dissolved in about 1500 parts of water. A solution of 167 parts of KF and 144 parts of KOH in about 800 parts of water was added to the first solution. The mixture was boiled, filtered, washed, dried and granulated to 6–14 mesh. The catalylst was dried in a stream of nitrogen up to 350° C., and reduced in a stream of hydrogen up to 350° C. It was calculated to contain about 55% calcium fluoride, about 15% copper metal and about 30% chromium oxide.

A vaporous mixture of 204 parts of $CCl_2FCClF_2$ (1.09 mols) and 2 parts of hydrogen (1 mol) was reacted in accordance with the procedure outlined in Example 1 except that the catalyst was maintained at a temperature of 350° C. 32 parts of $CClF=CF_2$, representing a conversion of 25.4%, were obtained.

Example 7.—A catalyst comprising copper metal and an oxide of chromium supported on calcium fluoride was prepared as follows: 167 parts of $Ca(NO_3)_2.4H_2O$, 29 parts of $Cu(NO_3)_2.3H_2O$ and 290 parts of $$Cr(NO_3)_3.9H_2O$$

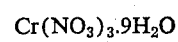

were dissolved in about 2000 parts of water. To this solution was added a solution of 167 parts of KF and 175 parts of KOH in about 1000 parts of water. The mixture was boiled, filtered, washed, dried and pelleted. The catalyst was reduced up to 350° C. in a stream of hydrogen and contained about 55% calcium fluoride and copper metal and chromium oxide in ratio of about 1 to 5.

A vaporous mixture of 155 parts of $CCl_2FCClF_2$ (0.83 mol) and 4 parts of hydrogen (2 mols) was reacted in accordance with Example 1 except that the catalyst was maintained at 350° C. and the mixture was passed through the reactor over a three hour period. 36 parts of $$CClF=CF_2$$

representing a conversion of 37.4%, were obtained.

*Example 8.*—A catalyst comprising copper metal and an oxide of chromium supported on calcium fluoride was prepared as follows: 167 parts of $Ca(NO_3)_2.4H_2O$, 15.6 parts of $Cu(NO_3)_2.3H_2O$ and 315 parts of $$Cr(NO_3)_3.9H_2O$$

were dissolved in about 3000 parts of water. To this solution was added a solution of 167 parts of KF and 153 parts of KOH dissolved in about 800 parts of water. The mixture was boiled, filtered, washed, dried and granulated to 6–14 mesh. The catalyst was reduced up to 350° C. in a stream of hydrogen and contained about 55% calcium fluoride, about 10% excess KOH, and copper metal and chromium oxide in ratio of about 1 to 10.

A vaporous mixture of 198 parts of $CCl_2FCClF_2$ (1.05 mols) and 2 parts of hydrogen (1 mol) was reacted in accordance with the procedure of Example 1 except that the catalyst was maintained at 350° C. 35 parts of $CClF=CF_2$, representing a conversion of 28.8%, were obtained.

*Example 9.*—A catalyst comprising nickel metal and an oxide of chromium was prepared as follows: 223 parts of $Ni(NO_3)_2.6H_2O$ and 346 parts of $$Cr(NO_3)_3.9H_2O$$

were dissolved in about 2000 parts of water. A solution of 277 parts KOH dissolved in about 800 parts of water was added to the first solution. The mixture was boiled, filtered, washed, dried and granulated to 6–14 mesh. The catalyst was reduced in a stream of hydrogen at 450° C. and contained a nickel : chromium oxide ratio of about 1:1.

A vaporous mixture of 189 parts of $CCl_2FCClF_2$ (1 mol) and 2 parts of hydrogen (1 mol) was reacted in accordance with the procedure of Example 1 except that the catalyst was maintained at a temperature of 350° C. 34 parts of $CClF=CF_2$, representing a conversion of 29.4% were obtained.

The results of Examples 1–9 are summarized in the following table:

| Example | Reactant | Catalyst | Temp., °C. | Percent Conversion to $CClF=CF_2$ |
|---|---|---|---|---|
| 1 | $CCl_2FCClF_2$ | Cu+Cr oxide on $CaF_2$ (ratio of Cu:Cr oxide of about 2:1). | 400 | 43 |
| 2 | $CCl_2FCClF_2$ | Cu on $CaF_2$ | 400 | 12.5 |
| 3 | $CCl_2FCClF_2$ | Cr oxide | 350 | none |
| 4 | $CCl_2FCClF_2$ | Cu+Cr oxide on $CaF_2$ (ratio of Cu:Cr oxide of about 1:1). | 350 | 24.1 |
| 5 | $CCl_2FCClF_2$ | Cu+Cr oxide (ratio of about 2:1) | 350 | 37.8 |
| 6 | $CCl_2FCClF_2$ | Cu+Cr oxide on $CaF_2$ (ratio of Cu:Cr oxide of about 1:2). | 350 | 25.4 |
| 7 | $CCl_2FCClF_2$ | Cu+Cr oxide on $CaF_2$ (ratio of Cu:Cr oxide of about 1:5). | 350 | 37.4 |
| 8 | $CCl_2FCClF_2$ | Cu+Cr oxide on $CaF_2$ (ratio of Cu:Cr oxide of about 1:10). | 350 | 28.8 |
| 9 | $CCl_2FCClF_2$ | Ni+Cr oxide (ratio of about 1:1) | 350 | 29.4 |

While the above describes the preferred embodiments of our invention, it will be understood that departures may be made therefrom within the scope of the specification and claims.

We claim:

1. In a process for preparing 1,1,2-trifluoro-2-chloroethylene, the step which comprises reacting a mixture of hydrogen and 1,1,2-trifluoro-1,2,2-trichloroethane in the vapor phase at temperatures between about 325° C. and about 425° C. in the presence of a catalyst comprising copper metal and an oxide of chromium.

2. In a process for preparing 1,1,2-trifluoro-2-chloroethylene, the step which comprises reacting a mixture of hydrogen and 1,1,2-trifluoro-1,2,2-trichloroethane in the vapor phase at temperatures between about 350° C. and about 400° C. in the presence of a catalyst comprising copper metal and an oxide of chromium.

3. In a process for preparing 1,1,2-trifluoro-2-chloroethylene, the step which comprises reacting a mixture of hydrogen and 1,1,2-trifluoro-1,2,2-trichloroethane in the vapor phase at temperatures between about 325° C. and about 425° C. in the presence of a catalyst comprising copper metal, an oxide of chromium and a catalyst support.

4. In a process for preparing 1,1,2-trifluoro-2-chloroethylene, the step which comprises reacting a mixture of hydrogen and 1,1,2-trifluoro-1,2,2-trichloroethane in the vapor phase at temperatures between about 350° C. and about 400° C. in the presence of a catalyst comprising copper metal, an oxide of chromium and calcium fluoride.

References Cited in the file of this patent

UNITED STATES PATENTS

| | | |
|---|---|---|
| 2,504,919 | Bordner | Apr. 18, 1950 |
| 2,615,925 | Bordner | Oct. 28, 1952 |
| 2,685,606 | Clark | Aug. 3, 1954 |
| 2,697,124 | Mantell | Dec. 14, 1954 |
| 2,704,775 | Clark | Mar. 22, 1955 |

FOREIGN PATENTS

| | | |
|---|---|---|
| 619,394 | Great Britain | Mar. 8, 1949 |

OTHER REFERENCES

Adkins et al.: "Jour. Am. Chem. Soc.," vol. 53 (pages 1091–5), 1931.